United States Patent [19]

Durand

[11] Patent Number: 5,114,323
[45] Date of Patent: May 19, 1992

[54] NUTATOR BEARING ASSEMBLY

[76] Inventor: John E. Durand, 26581 Dolorosa, Mission Viejo, Calif. 92691

[21] Appl. No.: 604,809

[22] Filed: Oct. 29, 1990

Related U.S. Application Data

[63] Continuation-in-part of Ser. No. 235,567, Aug. 24, 1988, Pat. No. 4,911,622.

[51] Int. Cl.⁵ .......................... F01C 1/02; G01F 3/08
[52] U.S. Cl. .......................................... 418/58; 73/256
[58] Field of Search .................. 418/58, 208; 73/256

[56] References Cited

U.S. PATENT DOCUMENTS 1,312,838  8/1919  Dembowsky .................. 418/58

Primary Examiner—John J. Vrablik
Attorney, Agent, or Firm—Robert L. Sassone

[57] ABSTRACT

The present invention is a nutating positive displacement device including a nutator with an inverted pendulous, low friction, substantially non sliding vertically elongated double pivoting nutator fulcrum. The fulcrum is one member comprising a bottom base coupled to a central beam coupled to a top nutator support bearing surface. The bottom of the fulcrum comprises a pivoting base pivotally and substantially non slidably mating with a base receptacle defined by a body interior surface. The base is coupled to the fulcrum beam which in turn supports the fulcrum nutator support bearing surface. The nutator support bearing surface pivotally and substantially non slidably mates with a nutator restraint defined by the center bottom surface of the nutator.

1 Claim, 1 Drawing Sheet

NUTATOR BEARING ASSEMBLY

The present application is a continuation in part of my nutator bearing assembly U.S. Pat. No. 4,911,622, filed Aug. 24, 1988.

Background of The Invention

1. Field of the Invention

The present invention relates to rolling contact nutator fulcrum pivoting nutator bearings and bearing assemblies.

2. Description of the Prior Art

The prior art includes my U.S. Pat. No. 4,911,622 and the art cited therein. My U.S. Pat. No. 4,911,622 overcame the wear problem which had prevented certain nutator assemblies having theoretical advantages from ever being of practical use in applications where resistance to wear had selected importance. My patent design in U.S. Pat. No. 4,911,622 suffers in extreme low flow applications from a high ratio of friction to force from the differential pressure resulting from extremely low flow fluid streams. In extremely low flow situations, the nutator stalls in a non sealing position, thereby permitting unmeasured flow. The design of U.S. Pat. No. 4,911,622 does not have the capability of forcing the nutating element to effect a seal between upstream and downstream in extremely low flow situations. When there is no seal, there is no mechanical advantage forcing the nutator to move in a selected direction.

SUMMARY OF THE INVENTION

The present invention is a nutating positive displacement device including a nutator capable of nutating within a nutation chamber defined by the interior surface of the body of the positive displacement device between an inlet into and an outlet out of the positive displacement device, wherein the positive displacement device is capable of performing the typical positive displacement device functions such as pump, generator, flow meter, etc.

The present invention comprises a nutator as described previously herein with an inverted pendulous, low friction, substantially non sliding vertically elongated double pivoting nutator fulcrum.

The fulcrum is one member comprising a bottom base coupled to a central beam coupled to a top nutator support bearing surface. The bottom of the fulcrum comprises a pivoting base pivotally and substantially non slidably mating with a base receptacle defined by a body interior surface. The base is coupled to the fulcrum beam which in turn supports the fulcrum nutator support bearing surface. The nutator support bearing surface pivotally and substantially non slidably mates with a nutator restraint defined by the center bottom surface of the nutator.

DRAWING DESCRIPTION

Reference should be made at this time to the following detailed description which should be read in conjunction with the following drawings of which:

DETAILED DESCRIPTION OF THE INVENTION

Figure 1:
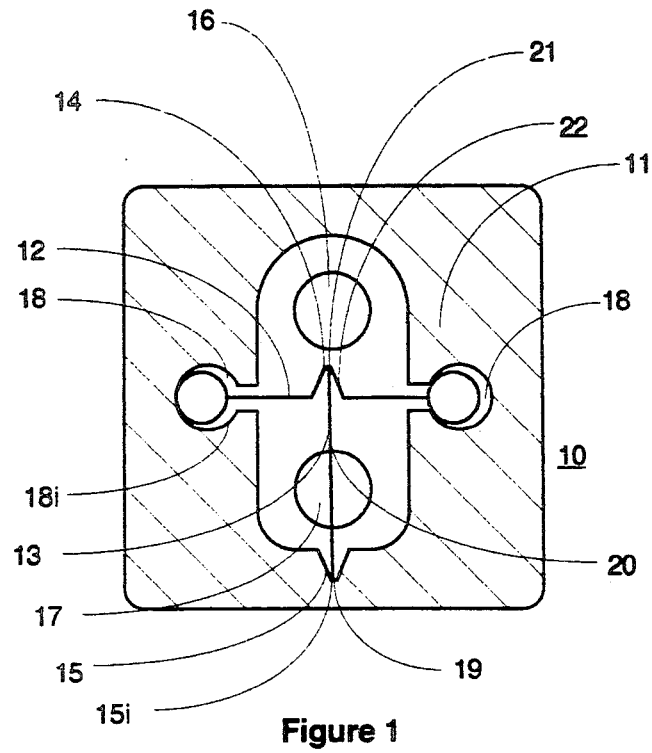
FIG. 1 is a partially cut away end view of the invention with the nutator in a first position to the left.
Figure 2:
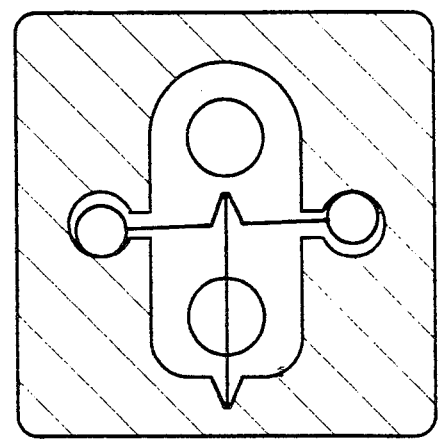
FIG. 2 is a partially cut away end view of the invention of FIG. 1 with the nutator displaced 90 degrees from the view of FIG. 1.
Figure 4:
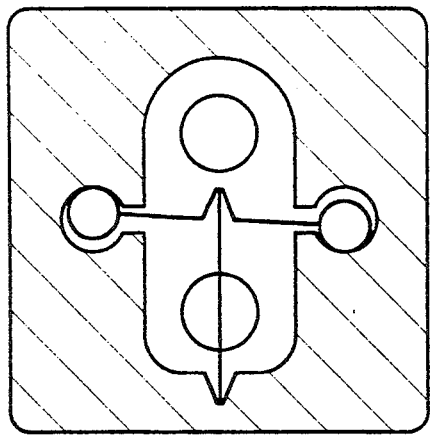
FIG. 4 is a partially cut away end view of the nutator of FIG. 1 with the nutator of FIG. 1 displaced 270 degrees.
Figure 3:
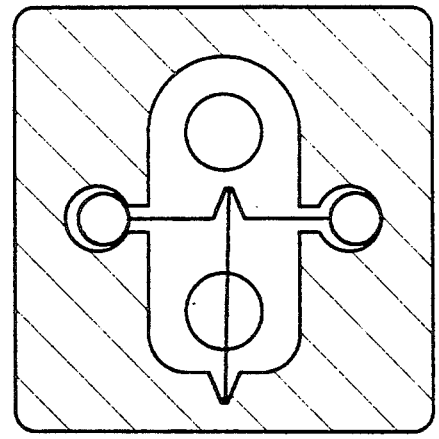
FIG. 3 is a partially cut away end view of the nutator of FIG. 1 with the nutator displaced 180 degrees from the view of FIG. 1.

The present invention is a nutating positive displacement device 10 including a nutator 12 capable of nutating within a nutation chamber 18 defined by the interior surface 18i of the body 11 of the positive displacement device 10 between an inlet 16 into and an outlet 17 out of the positive displacement device 10, wherein the positive displacement device 10 is capable of performing the typical positive displacement device functions such as pump, generator, flow meter, etc.

The present invention 10 comprises a nutator 12 as described previously herein with an inverted pendulous, low friction, substantially non sliding vertically elongated double pivoting nutator fulcrum 13.

The fulcrum 13 is one member 13 comprising a bottom base 19 coupled to a central beam 20 coupled to a top nutator support bearing surface 21. The bottom base 19 of the fulcrum 13 comprises a pivoting base 19 pivotally and substantially non slidably mating with a base receptacle 15 defined by a body interior surface 15i. The bottom base 19 is copied to the fulcrum beam 20 which in turn supports the fulcrum nutator support bearing surface 21. The nutator support bearing surface 21 pivotally and substantially non slidably mates with a nutator restraint 22 defined by the center bottom surface 14 of the nutator 12.

In a prior art nutator, when flow becomes very slow, the attendant forces become very small and therefore insufficient to overcome friction between the nutator and prior art bearings. Accordingly, the nutator stalls in positions which cannot effect a seal between inlet and outlet ports. The fluid then flows through from inlet port to and out the outlet port without appropriately displacing the nutator. This in turn produces no indication of the fluid flow which is actually taking place. The present invention 10 substantially reduces friction between the nutator 12 and the fulcrum 13 which comprises the base 19, bearing surface 21 and beam section 20. Reduction of the friction enhances the probability of the nutator to move in a selected direction in response to very small volumes of fluid flow which generate very small resultant forces.

A particular example of the invention has been described herein. Other examples will be obvious to those skilled in the art. The invention is limited only by the following claims.

I claim:

1. In a nutating positive displacement device including a nutator capable of nutating within a nutation chamber defined by the interior surface of the body of the positive displacement device between an inlet into and an outlet out of the positive displacement device, wherein the positive displacement device is capable of performing the typical positive displacement device functions such as pump, generator, flow meter, etc., an inverted pendulous, low friction, substantially non sliding nutator vertically elongated double pivoting fulcrum, wherein:

the fulcrum is one member comprising a bottom base coupled to a central beam coupled to a top nutator support bearing surface, the bottom of the fulcrum comprising a pivoting base pivotally and substantially non slidably mating with a base receptacle defined by a body interior surface, the base coupled to the fulcrum beam which in turn supports the fulcrum nutator support bearing surface, and the nutator support bearing surface pivotally and substantially non slidably mates with a nutator restraint defined by the center bottom surface of the nutator.

* * * * *